United States Patent [19]

Stegeman

[11] Patent Number: 5,223,749
[45] Date of Patent: Jun. 29, 1993

[54] CHARGING CIRCUIT

[75] Inventor: Albert P. Stegeman, Hengelo, Netherlands

[73] Assignee: Hollandse Signaalapparaten B.V., Hengelo, Netherlands

[21] Appl. No.: 760,924

[22] Filed: Sep. 17, 1991

[30] Foreign Application Priority Data

Oct. 4, 1990 [NL] Netherlands .......................... 9002153

[51] Int. Cl.$^5$ ............................................. H03K 3/00
[52] U.S. Cl. ..................................... 307/106; 307/113
[58] Field of Search ...................... 307/106, 112, 113; 323/222, 232, 229

[56] References Cited

U.S. PATENT DOCUMENTS

| | | | |
|---|---|---|---|
| 4,546,304 | 10/1985 | Schwarz | 323/222 |
| 4,782,242 | 11/1988 | Kovacs | 307/106 |
| 4,818,892 | 4/1989 | Oohashi et al. | 307/106 |

FOREIGN PATENT DOCUMENTS

3104965  8/1982  Fed. Rep. of Germany .
3829387  3/1990  Fed. Rep. of Germany .
8201448  4/1982  World Int. Prop. O. .

OTHER PUBLICATIONS

Patent Abstracts of Japan, vol. 8, No. 127, Jun. 14, 1984, JP-A-59-37882, (Nippon Denki K.K.), Mar. 1, 1984.

*Primary Examiner*—Jeffrey A. Gaffin
*Attorney, Agent, or Firm*—Oblon, Spivak, McClelland, Maier & Neustadt

[57] ABSTRACT

A resonant charging circuit for the charging of a pulse-forming network from a voltage source is provided with a first serial circuit provided with a first switch, an inductor and a first diode for charging the pulse-forming network. The charging circuit is further provided with a second serial circuit provided with a second diode, the inductor, a third diode, and a second switch for feeding excess energy, stored into the inductor, back to the voltage source. Opening and closing of the first and second switches takes place under the control of a control unit.

2 Claims, 1 Drawing Sheet

CHARGING CIRCUIT

BACKGROUND OF THE INVENTION

The invention relates to a charging circuit for charging, from a voltage source, a pulse-forming network to a predetermined voltage.

Such a circuit can be applied in a radar transmitter for the generation of radar transmit pulses. The radar transmitter will in that case be provided with a high-power radar transmitter tube, such as a crossfield amplifier, a travelling wave tube or a klystron, whose cathode must be brought to a pulsed high voltage. The high-voltage pulses are generated by a high-voltage transformer, the primary winding of which is connected to a low-voltage pulse generator, consisting of at least a pulse-forming network and a switching element.

As regards applications where a radar system's only task is to detect moving objects, heavy demands are made on the reproducibility of the high-voltage pulses, applied to the radar transmitter tube. As a consequence of minor variations in the high-voltage pulses, stationary objects also seem to move, which may easily cause an overload on the equipment, processing the target echoes, received by the radar system.

The reproducibility of the high-voltage pulses is to a considerable extent determined by the reproducibility of the charging voltage of the pulse-forming network. The charge is usually provided by a buffer capacitor, which is powered from the mains via a rectifier circuit.

The charging voltage of the buffer capacitor is not constant, it varies with the mains voltage and is often afflicted with a ripple voltage, originating from the rectifier circuit.

A method well-known in the art for charging a pulse-forming network is the resonant charging through an inductor. If the pulse-forming network has reached the required voltage, the charging current is interrupted and the residual energy stored in the inductor is fed back via a circuit which is connected to the inductor by way of secondary winding. At that moment the inductor is in fact a transformer.

The drawback of this method is that the residual energy in one winding of a transformer can never be completely drained via the other winding of that transformer, because of the leakage self-inductance of the transformer. As a consequence, the pulse-forming network will receive some additional charge from the primary winding of the transformer after the interruption of the actual charging current. Moreover, the amount of additional charge is a function of the instantaneous charging voltage of the buffer capacitor, which means that the reproducibility of the charging voltage of the pulse-forming network is adversely affected.

A conventional circuit of the resonant type is schematically represented in FIG. 1. A buffer capacitor 1 is charged from the mains voltage. Under the control of a control unit 2, switching element 3 closes, as a result of which current can flow via an inductor 4 to a pulse-forming network 5, in this case represented by a capacitor. In reality, pulse-forming network 5 is also provided with inductors, but these hardly play any role during charging. The voltage on the pulse-forming network 5 is applied to control unit 2 and when this voltage has reached a predetermined value V, switching element 3 is opened under the control of control unit 2. At this moment there will still be a current I flowing through inductor 4. Via a diode 6 this current can continue to flow after the opening of switching element 3. Eventually the current will cease to flow, but the voltage on the pulse-forming network has meanwhile increased according to the formula:

$$\tfrac{1}{2}C(V')^2 = \tfrac{1}{2}CV^2 + \tfrac{1}{2}LI^2,$$

where C is the capacitance of the pulse-forming network 5, L is the self-inductance of inductor 4, V is the voltage on the pulse-forming network during the opening of switching element 3, I is the current through the inductor 4 during the opening of switching element 3 and V' is the ultimate voltage on the pulse-forming network; this on the assumption that the capacitance of buffer capacitor 1 is very much larger than the capacitance of pulse-forming network 5. The ultimate voltage V' depends on I and consequently on the instantaneous voltage on buffer capacitor 1. This voltage in particular strongly fluctuates, as a consequence of mains fluctuations and a continuously present ripple voltage, caused by the rectification of the mains voltage.

A conventional charging circuit of the resonant type is represented in FIG. 2. Here again, switching element 3 closes under the control of the control unit 2, as a result of which a current can flow to pulse-forming network 5 via a primary winding 7A of a transformer 7. A switching element 8 is in open condition, so that no current can flow in a secondary winding 7B of transformer 7. In this condition the primary winding of transformer 7 actually forms an inductor, so that the behaviour of the circuit is identical to that of the circuit which is schematically represented in FIG. 1. When the voltage on pulse-forming network 5 has reached a predetermined value V, witching element 3 is opened under the control of control unit 2. At the same time, however, switching element 8 is closed, as a result of which energy, stored in the magnetic field of transformer 7, is fed back to buffer capacitor 1 via a current through the secondary winding, a diode 9 and switching element 8. If the magnetic coupling between the primary winding 7A and the secondary winding 7B of transformer 7 is perfect, the condition can be attained that no more energy is supplied to pulse-forming network 5 after the opening of switching element 3. In the event of a less perfect coupling the following applies again:

$$\tfrac{1}{2}C(V')^2 = \tfrac{1}{2}CV^2 + \tfrac{1}{2}LI^2,$$

L now representing however the leakage self-inductance of transformer 7. As compared with the simple charging circuit, as schematically represented in FIG. 1, there is an improvement of orders of magnitude in the reproducibility of the charging voltage of the pulse-forming network.

SUMMARY OF THE INVENTION

The invention eliminates this drawback and is to this effect provided with:

i) a first serial circuit provided with a first switch, an inductive element, a first diode and the pulse-forming network;

ii) a second serial circuit provided with a second diode, the inductive element, a third diode and a second switch; and iii) a control unit for opening and closing the first and second switch, whereby the control unit closes the first switch at the start of a charging cycle, causing the energy from the voltage source to be supplied to the pulse-forming network via the first serial circuit and whereby the control unit opens the first switch and substantially simultaneously closes the second switch when the predetermined voltage has been reached.

BRIEF DESCRIPTION OF THE DRAWINGS

The invention will not be described in more detail with reference to the following figures, of which.

DESCRIPTION OF THE PREFERRED EMBODIMENT

Figure 1:
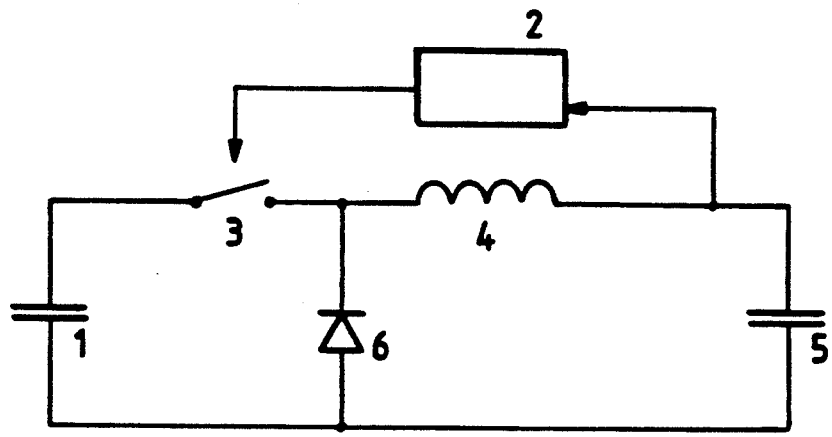
FIG. 1 illustrates a simple resonant charging circuit.
Figure 2:
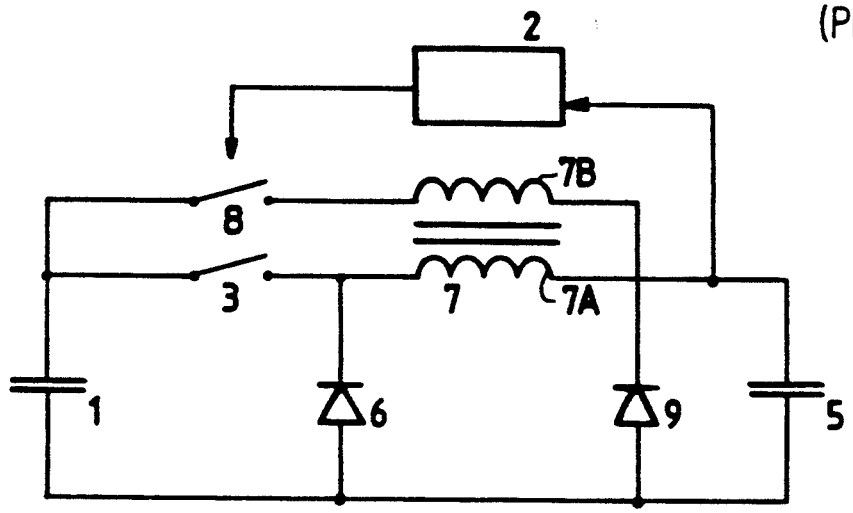
FIG. 2 illustrates a state-of-the-art charging circuit.
Figure 3:
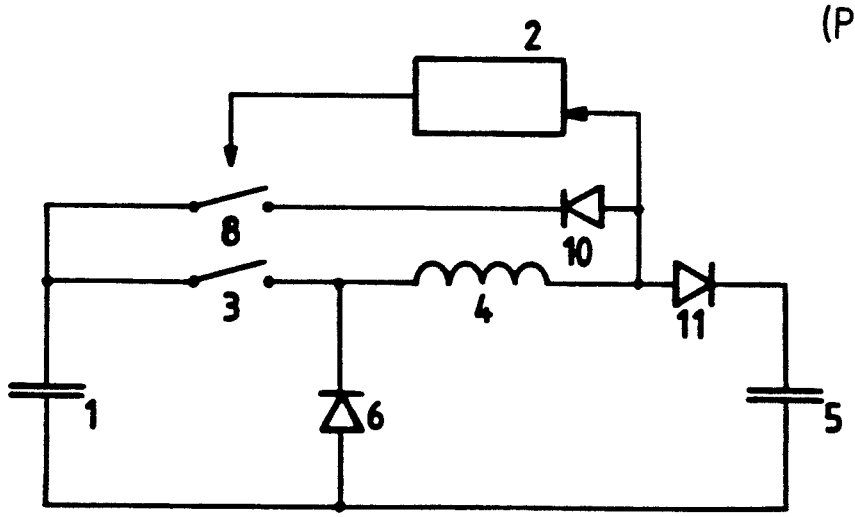
FIG. 3 illustrates a charging circuit according to the invention.

A charging circuit according to the invention is schematically represented in FIG. 3. Switching element 3 closes again under the control of control unit 2, as a result of which current can flow to pulse-forming network 5. Switching element 8 is in open condition. When the voltage on pulse-forming network 5 has reached a predetermined value V, switching element 3 is opened under the control of control unit 2. At the same time switching element 8 is closed however. The current I, which at that moment still flows through inductor 4, will be fed back to the buffer capacitor 1 via diode 6 and a diode 10.

A precondition is that, at the opening of switching element 3, the voltage on pulse-forming network 5 exceeds the voltage on buffer capacitor 1. Since the capacitance of buffer capacitor 1 is much larger than the capacitance of pulse-forming network 5, the voltage on pulse-forming network 5 will, when switching element 3 does not open, eventually be virtually twice the voltage on buffer capacitor 1 as a result of the resonant charging, so that the above precondition can always be met.

In implementing the charging circuit as schematically represented in FIG. 3, Insulated Gate Bipolar Transistors may be used to advantage as switching elements, which transistors, even with the large currents in the charging circuit they have to cope with, still achieve a short switching time.

I claim:

1. A charging circuit for charging, from a voltage source, a pulse-forming network to a predetermined voltage, comprising:
   a first serial circuit provided with a first switching element, an inductor, a first diode and the pulse-forming network;
   a second serial circuit provided with a second diode, the inductor, a third diode and a second switching element; and
   a control unit for opening and closing the first and second switching elements, whereby the control unit closes the first switching element at the start of a charging cycle, for causing the energy from the voltage source to be supplied to the pulse-forming network via the first serial circuit and whereby the control unit opens the first switching element when the predetermined voltage has been reached and substantially simultaneously closes the second switching element for causing the energy contained in the inductor to flow back to the voltage source.

2. The circuit as claimed in claim 1, wherein the first and second switch are provided with Insulated Gate Bipolar Transistors.

* * * * *

UNITED STATES PATENT AND TRADEMARK OFFICE
CERTIFICATE OF CORRECTION

PATENT NO. : 5,223,749
DATED : June 29, 1993
INVENTOR(S) : Albert P. Stegeman

It is certified that error appears in the above-indentified patent and that said Letters Patent is hereby corrected as shown below:

In column 2, line 34, change "witching" to --switching--.

Signed and Sealed this

Fifth Day of April, 1994

Attest:

BRUCE LEHMAN

Attesting Officer

Commissioner of Patents and Trademarks